(12) United States Patent
Sperber

(10) Patent No.: US 6,708,987 B1
(45) Date of Patent: Mar. 23, 2004

(54) CLAMPING DEVICE FOR THE REMOVABLY FASTENING A PART UPON A SHAFT

(75) Inventor: Matthias Sperber, Wachenroth (DE)

(73) Assignee: Ina-Schaeffler KG (DE)

( * ) Notice: Subject to any disclaimer, the term of this patent is extended or adjusted under 35 U.S.C. 154(b) by 79 days.

(21) Appl. No.: 10/049,068

(22) PCT Filed: Aug. 8, 2000

(86) PCT No.: PCT/EP00/07476

§ 371 (c)(1),
(2), (4) Date: Feb. 5, 2002

(87) PCT Pub. No.: WO01/10600

PCT Pub. Date: Feb. 15, 2001

(30) Foreign Application Priority Data

Aug. 7, 1999 (DE) .......................... 199 37 436

(51) Int. Cl.⁷ ............................................... B23F 23/12
(52) U.S. Cl. ....................... 279/4.03; 403/31; 409/234
(58) Field of Search ............... 279/4.01, 4.03, 279/4.05; 403/31, 320; 411/81, 432; 451/359; 83/666; 409/234, 232

(56) References Cited

U.S. PATENT DOCUMENTS

| 4,697,966 A | | 10/1987 | Baur |
| 5,125,776 A | * | 6/1992 | Muller et al. ............... 279/4.01 |
| 5,161,334 A | * | 11/1992 | Schaal et al. .................. 83/666 |
| 5,435,577 A | * | 7/1995 | Bauer et al. ................ 279/4.01 |
| 6,050,741 A | * | 4/2000 | Aultman et al. ............. 411/432 |

FOREIGN PATENT DOCUMENTS

| DE | 69013966 | 4/1985 |
| DE | 3422000 | 12/1985 |
| EP | 0253181 | 1/1988 |
| EP | 0480163 | 4/1992 |
| WO | 9407042 | 3/1994 |

* cited by examiner

*Primary Examiner*—Daniel W. Howell
(74) *Attorney, Agent, or Firm*—Muserlian, Lucas and Mercanti

(57) ABSTRACT

A clamping device for the releasable fastening of a part (grinding wheel 1) on a shaft has a clamping nut (3) which can be screwed onto the shaft and is intended for clamping the part in place. A chamber (9) is provided between a pressure member (load piston 5) for bearing against the part (grinding wheel 1) and the clamping nut (3), this chamber (9) containing a hydraulic pressure medium (silicone oil 11). Furthermore, an escape space (15) which can be connected to the chamber (9) is provided for the hydraulic pressure medium in order to remove the clamping pressure from the grinding wheel (1).

19 Claims, 2 Drawing Sheets

CLAMPING DEVICE FOR THE REMOVABLY FASTENING A PART UPON A SHAFT

This application is a 371 of PCT/EP00/07476 filed Aug. 2, 2000.

FIELD OF THE INVENTION

The present invention relates to a clamping device for the releasable fastening of a part on a shaft, a clamping nut which can be screwed onto the shaft being provided for clamping the part in place.

BACKGROUND OF THE INVENTION

EP 0 480 163 A1, for example, has disclosed a quick-clamping device, in particular for fastening disk-shaped tools to a drive spindle of a powered hand tool. The quick-clamping device has a nut, with pressure plate axially supported thereon, and a hand-screw part enclosing the nut and the pressure plate, the nut and the hand-screw part forming an annular space in between, in which spherical rolling bodies are contained, these rolling bodies bearing against surfaces of these three elements and rolling there on longitudinal paths. The surfaces of the hand-screw part are symmetrical to one another, so that approximately axially parallel contact points are obtained there, whereas the track of the supporting surface of the nut lies on a larger circumferential circle than the opposite track of the pressure plate, as a result of which a rotary movement is transmitted to the nut when the hand-screw part is rotated and the pressure plate is fixed. Manual actuation for fastening a disk-shaped tool to a powered hand tool, or for releasing said disk-shaped tool, is thus possible without a tool.

The satisfactory symmetrical arrangement of said surfaces relative to one another is necessary for satisfactory operation of this quick-clamping device. Additional sealing rings which are intended to prevent the ingress of contaminants or foreign substances into the space defined by the surfaces are provided. Furthermore, the pressure plate must be satisfactorily oriented relative to the nut and guided in a movable manner, so that the desired rolling conditions are ensured. Furthermore, the possibility of the hand-screw part striking, for example, the workpiece to be machined during the operation of the powered hand tool cannot be ruled out, in the course of which undesirable rotation of the hand-screw part may occur, which leads to relief of the clamped grinding wheel and thus to unintentional release of the grinding wheel.

The object of the present invention is therefore to specify a clamping device according to the features of the preamble of claim 1 in which these disadvantages are eliminated.

According to the invention, this object is achieved in that a chamber is provided between a pressure member for bearing against the part and the clamping nut, this chamber containing a hydraulic pressure medium, an escape space which can be connected to the chamber being provided for the hydraulic pressure medium. When the escape space is connected, the clamping pressure is removed from the grinding wheel at least to such an extent that release of the clamping nut by hand is possible without additional auxiliary tools. The clamping force is directed into the clamping nut by the pressure member via the hydraulic pressure medium. The pressure in the hydraulic pressure medium, under the effective clamping force, is increased relative to the atmospheric pressure.

The clamping device according to the invention has considerable advantages over the known clamping device. No surfaces on which balls can roll have to be machined; no special measures need be taken in order to ensure that the parts having these surfaces are positioned relative to one another in a highly precise manner.

If the clamping device according to the invention is used, for example, in an angle grinder, the grinding wheel is clamped in place between a counterholder and the clamping device according to the invention. During the operation of such angle grinders, the clamping nut normally tightens automatically, so that the grinding wheel is firmly clamped in place between the counterholder and the pressure member of the clamping device according to the invention. The clamping force is directed into the clamping nut via the hydraulic pressure medium, the clamping nut transmitting this clamping force via the screwed connection into the screw spindle of the angle grinder. If the grinding wheel is now to be removed, no separate tool is required in order to release the clamping device according to the invention from the screw spindle. The escape space is merely connected to the chamber in which the hydraulic pressure medium is arranged under pressure. The hydraulic pressure medium, under the pressure inherent in it, now escapes into the escape space, the pressure in the hydraulic pressure medium being rapidly reduced on account of the increase in volume of the chamber. After the pressure reduction has been effected, the pressure member and consequently also the grinding wheel are relieved to such an extent that manual unscrewing of the clamping nut or of the clamping device according to the invention is possible without any problems.

The hydraulic pressure medium used may be, for example, hydraulic oil or also an easily deformable, at least approximately incompressible solid, a hydraulic oil probably being advantageous for many applications.

The escape space is preferably cleared or blocked by a closure member, in which case a slide, for example, may be used for this purpose, this slide being arranged between chamber and escape space and producing the connection between chamber and escape space after it has been actuated. An advantageous development according to the invention provides a driving piston as closure member, this driving piston being arranged in the escape space in a longitudinally displaceable manner and, depending on the position selected, clearing or blocking the escape space. The escape space may then be described as the space which the piston displaces or clears during the piston travel.

The chamber for accommodating the hydraulic pressure medium may be sealed off by suitable seals. However, a development according to the invention provides for the hydraulic pressure medium to be arranged in a flexible closed envelope which is impermeable to the hydraulic pressure medium. The envelope filled with the hydraulic pressure medium—for example silicone oil—is merely inserted into the chamber, so that no further sealing devices are necessary. The envelope is made in such a way that it can follow deflections of the pressure member and of the closure member. The envelope is preferably designed as an annular body which can be put onto the shaft.

The pressure member preferably has an, in particular annular, load piston which is arranged on the shaft in a longitudinally displaceable manner and defines the chamber. The load piston can retract in the direction of the chamber when the hydraulic pressure medium escapes into the escape space. The load piston, with its one front end, can load, for example, the grinding wheel.

The driving piston (already mentioned) of the closure member defines the escape space. The load piston and the driving piston are preferably arranged in recesses of the clamping nut in a longitudinally displaceable manner, in which case the clamping nut, with its walls defining these recesses, defines the chamber and/or the escape space. This development according to the invention is especially space-saving, since the chamber for accommodating the hydraulic pressure medium and said escape space can be integrated in the clamping nut in a simple manner.

The load piston and the driving piston each have a piston area which can be acted upon by the hydraulic pressure medium, the piston area of the load piston being greater than the piston area of the driving piston. The smaller the piston area of the driving piston, the smaller the force which acts on the driving piston from the hydraulic pressure medium under high pressure when the driving piston blocks the escape space. In the clamping device according to the invention, the escape space is designed for accommodating as much hydraulic pressure medium as required for at least partly removing the clamping pressure from the clamping disk. Depending on the design of the individual components, a displacement travel of approximately just 3/10 mm of the pressure member may be sufficient in order to relieve the clamping disk for manual release of the clamping nut. This means that the displacement travel of the driving piston relative to the displacement travel of the load piston behave in inverse proportion to the ratio of the piston areas of the driving piston and load piston.

So that the closure member reliably blocks the escape space, a holding device is preferably provided, this holding device holding the driving piston in the position in which the escape space is blocked. This holding device may have a pushbutton and locking bodies, the pushbutton holding the locking bodies between the driving piston and a stop. Under the pressure force of the hydraulic pressure medium, the driving piston is pressed via the locking bodies against the stop and is satisfactorily supported on the stop. This stop may be formed, for example, directly on the clamping nut; however, it may also be formed by an angled flange of a sheet-metal sleeve which is pressed into a bore of the clamping nut.

The holding device referred to is designed in such a way that the depressed pushbutton opens a clearance space for accommodating the locking bodies. Under the pressure force, acting on the driving piston, of the hydraulic pressure medium, the locking bodies are pressed into this clearance space, the driving piston now being run directly against the stop. In this situation, the escape space is completely cleared, so that the escape space is connected to the chamber. The displacement of the locking bodies—which are preferably formed by balls—into the clearance space is preferably assisted by a sloping surface which is formed on a front end of the driving piston. When the pushbutton is in its initial position—that is when the pushbutton is not depressed—the locking bodies are supported on a supporting surface of the pushbutton. This supporting surface may be formed, for example, by the cylindrical lateral surface of the pushbutton. The sloping surface already mentioned and provided on the driving piston is preferably arranged at an oblique angle to this supporting surface and at an oblique angle to the stop. This means that the locking bodies, preferably the balls, are clamped in place between the driving piston, the pushbutton and the stop, which is preferably formed on the clamping nut. The supporting surface and the stop surface are preferably arranged at right angles to one another. The sloping surface is inclined in the direction of the clearance space for accommodating the locking bodies. The clearance space is preferably formed by a circumferential groove which is formed on the pushbutton and is axially adjacent to the supporting surface.

If the driving piston blocks the escape space, the locking bodies, preferably designed as balls, are supported on the sloping surface of the driving piston, the stop surface of the stop, and the supporting surface of the pushbutton. The position and magnitude of the resulting force which is transmitted between the supporting surface and the ball depends on the inclination of the sloping surface. This resulting force may in turn be represented by two equivalent forces which are at right angles to one another, one of which is arranged perpendicularly to the supporting surface of the pushbutton and the other of which is arranged perpendicularly to the stop surface of the stop. The inclination of the sloping surface therefore establishes the magnitude of the equivalent force acting on the supporting surface. For simple operation of the pushbutton, it is advisable for the equivalent force acting on the supporting surface to be kept so small that it is possible to depress the pushbutton without any problems. The more acute the angle of inclination between the sloping surface and the longitudinal axis of the driving piston, the greater is the equivalent force which acts on the supporting surface of the pushbutton.

The pushbutton is preferably moved into its initial position under spring deflection by the force of a spring. The pushbutton can be arranged in a radially or axially directed recess of preferably the clamping nut, that is to say it can be displaced radially or axially.

BRIEF DESCRIPTION OF THE DRAWINGS

The invention is explained in more detail below with reference to three exemplary embodiments shown in a total of four figures. In the drawings.

DETAILED DESCRIPTION OF THE DRAWINGS

Figure 1:
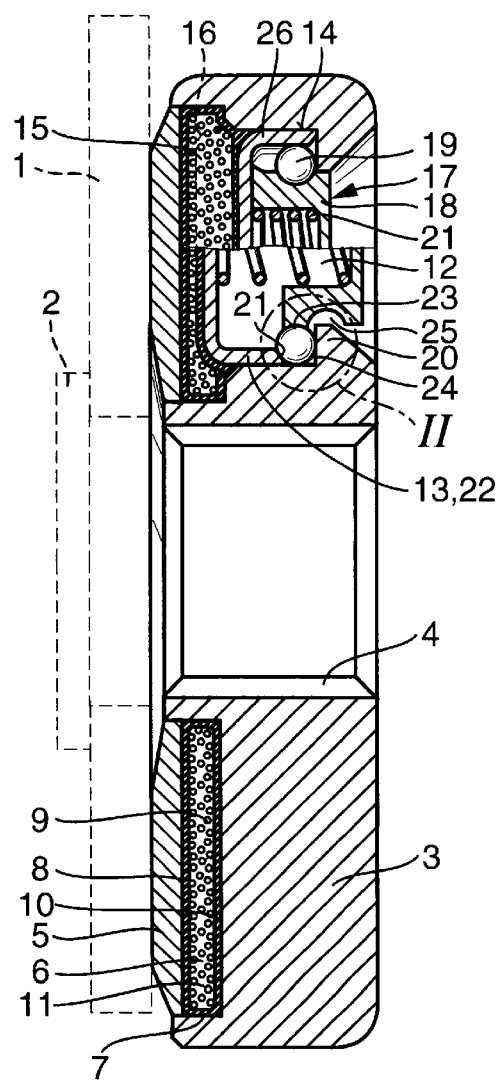
FIG. 1 shows a longitudinal section through a clamping device according to the invention.

FIG. 1 shows a clamping device for the releasable fastening of a grinding wheel 1 (only indicated) on a screw spindle (not shown) of an angle grinder. For this purpose, the grinding wheel 1 is clamped between a counterholder 2 (only indicated) and the clamping device according to the invention.

The clamping device according to the invention has a clamping nut 3 which is provided with a tapped hole 4 for screwing on the screw spindle (not shown). Arranged between the grinding wheel 1 and the clamping nut 3 is a load piston 5, which is arranged in a longitudinally displaceable manner in a first recess 6 of the clamping nut 3. A cylindrical surface 7 of the clamping nut 3, on the one hand, defines the first recess 6 and, on the other hand, can serve as a guide for the load piston 5. With its end face facing the grinding wheel 1, the load piston 5 bears against the grinding wheel 1 and defines a chamber 9 with its opposite end face 8, this chamber 9 being formed by the recess 6 in the clamping nut 3. Inserted into the annular chamber 9 is a likewise annular envelope 10, which is flexible and impermeable to a silicone oil 11 which is enclosed in the envelope 10.

The clamping nut 3 is provided with a second recess 12 in which a driving piston 13 is arranged in a longitudinally displaceable manner. A cylindrical surface 14 of the clamping nut 3 defines the second recess 12.

Below the center line of the second recess 12, the driving piston 13 is shown in its first position, in which the escape space 15 is blocked. Above this center line, the driving piston 13 is shown in its second position, in which the escape space 15 is connected. In this clamping device according to the invention, the escape space 15 is therefore defined by the volume that the driving piston 13 clears during its displacement travel from the first position into its second position or by the volume which the driving piston 13 displaces when it is displaced from its second position into the first position.

It can be seen from FIG. 1 that the escape space 15 defined by the boundary line 16 indicated is both part of the first recess 6 and part of the second recess 12. However, it is readily possible for the escape space 15 to be formed solely within the first or the second recess 6, 12. For this purpose, the driving piston 13, with its end face facing the envelope 10, would be longitudinally displaceable either solely outside the second recess 12 or solely inside the second recess 12.

A holding device 17 is provided which holds the driving piston 13 in the second position, in which the escape space 13 is blocked. This holding device 17 comprises a pushbutton 18, balls 19, a stop 20 formed on the clamping nut 3, a spring 21 pressing the pushbutton 18 into its initial position, and a sloping surface 21 provided at a front end of the driving piston 13. The driving piston 13, which is formed in a cup shape from sheet metal, is provided with the sloping surface 21 at the front free end of the piston skirt 22. Under the pressure of the silicone oil 11, the driving piston 13 is pressed in the direction of the balls 19, the balls 19 being clamped in place between the sloping surface 21, a supporting surface 23 and on a stop surface 24 of the stop 20.

Figure 2:
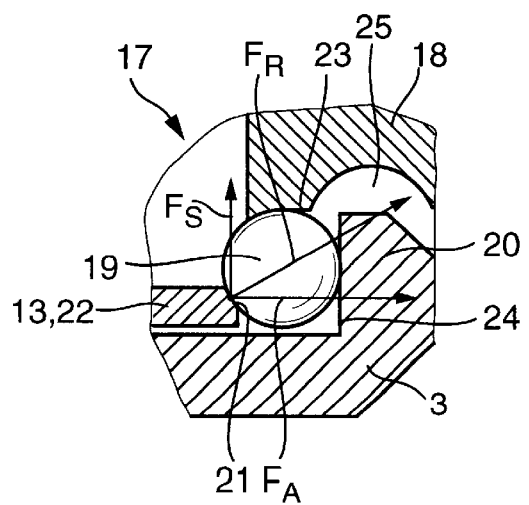
FIG. 2 shows a detail of the clamping device according to FIG. 1.

FIG. 2, in an enlarged illustration, shows a detail of the holding device 17. It can be seen from the illustration that the pushbutton 18 has a ball groove 25 axially adjacent to the supporting surface 23, which is formed by the cylindrical lateral surface of the pushbutton 18, and the balls 19 can engage in said ball groove 25, as described further below. It can also be seen from the representation that a resulting force $F_R$ is initiated in the ball 19 at the contact point between the driving piston 13 and the ball 19. This force $F_R$ can be resolved into the two equivalent forces $F_S$ and $F_A$, the force $F_S$ being a supporting force which is formed perpendicularly to the supporting surface 23 of the pushbutton 18. The force $F_A$ is a stop force which is arranged perpendicularly to the stop surface 24 of the stop 20.

A change in the inclination of the sloping surface 21 results in a change in the resulting force $F_R$ and in the supporting force $F_S$, whereas the stop force $F_A$ remains constant. This force division is made possible by an annular design of the supporting surface 23, of the stop surface 24 and of the sloping surface 21.

The functioning of the clamping device according to the invention is explained in more detail below. During operation of the angle grinder, the grinding wheel 1 is clamped in place between the counterholder 2 and the clamping device according to the invention. The driving piston 13 is held by means of the holding device 17 in its first position, that is in its position on the left-hand side, in which the escape space 15 is blocked. To relieve the grinding wheel 1, the pushbutton 18 is now pushed to the left against the spring force of the spring 21. During this axial displacement of the pushbutton 18, the supporting surface 23 of the pushbutton 18 slides past the balls 19 until finally the balls 19 and the ball groove 24 of the pushbutton 18 are opposite one another. In this situation, the balls 18 are displaced radially inward by the effective supporting force $F_S$ until they finally bear against the bottom of the ball groove 25. The piston skirt 22 of the driving piston 13 can now be pressed to the right in the direction of the stop surface 24 of the stop 20 between the balls 19 and the wall 26 of the second recess 12 by the pressure force of the silicone oil 11. This axial displacement of the driving piston 13 is completed when the driving piston 13, with its one front end, strikes the stop surface 24. In this situation, the escape space 15 is completely cleared. This means that the volume of the chamber 9 is enlarged by the escape space 15 being connected, in the course of which the envelope 10 pushes into the escape space 15, so that the pressure in the silicone oil 11 is rapidly reduced. The result of the pressure reduction is that the load piston 5 performs an axial movement, even though only slight, away from the grinding wheel 1. This axial displacement is sufficient in order to remove the clamping pressure from the grinding wheel 1 at least to such an extent that the clamping nut 3 can easily be unscrewed completely from the driving spindle by hand without the need for a separate tool.

If the chamber 9 is pressureless, that is to say if the pressure in the silicone oil 11 corresponds to the atmospheric pressure, the procedure for resetting the pushbutton 18 into its initial position may be described as follows. After the manually applied pressure force on the pushbutton 18 has been removed, the compressed spring 21 exerts an axial pressure force on the driving piston 13 and on the pushbutton 18. Under this pressure force, first of all the driving piston 13 is now displaced to the left in the direction of the chamber 9 until the piston skirt 22 has been pushed past the balls 19. The balls 19 are now clamped in place only between the ball groove 25 and the stop surface 24. Since there is no radial supporting force, there is no equilibrium of forces. The spring 21 is still not relieved and continues to exert an axial pressure force on the pushbutton 18. Under this pressure force, the balls 19 are now pushed radially out of their ball grooves 25 until they finally comes to bear against the sloping surface 21 of the driving piston 13, of the stop surface 24 of the stop, and of the supporting surface 23 of the pushbutton 18. In this situation, the driving piston 13 is arranged in its first position, in which the escape space 15 is blocked. The clamping device according to the invention may be used for clamping again.

Figure 3:
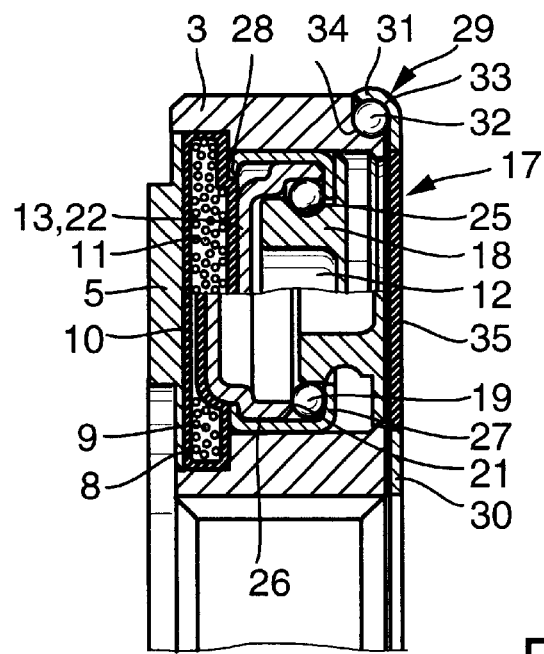
FIG. 3 shows a further clamping device according to the invention in longitudinal half section.

The inventive clamping device according to FIG. 3 differs from that from FIGS. 1 and 2 essentially by virtue of the fact that a sheet-metal sleeve 26 is pressed into the second recess 12, the flange 27 of this sheet-metal sleeve 26 being angled radially inward and forming the stop for the balls 19. At its front end remote from the flange 27, the sheet-metal sleeve 26 is provided with a further flange 28, which is drawn radially inward and is provided as a stop for the driving piston 13. The holding device 17 is a construction unit which is essentially formed from the sheet-metal sleeve 26, the pushbutton 18, the driving piston 13, and the balls 19. This construction unit can be pushed into the second recess 12 without any problems.

A further difference from the inventive clamping device according to FIGS. 1 and 2 consists in the fact that the clamping nut 3 is provided with a check piece 29 at its front end remote from the load piston 5. This check piece 29 has a cover disk 30 which is provided with an axial flange 31 at its outer periphery. The cover disk 30 is snapped with its axial flange 31 onto a ball ring 32, the balls of the ball ring 32 rolling on ball grooves 33, 34 of the clamping nut 3 and the cover disk 30. If the clamping nut, during operation of the angle grinder, butts with the cover disk 30 against, for example, the workpiece to be machined, the cover disk 30 is braked, in the course of which the clamping nut 3 continues to rotate, while the balls of the ball ring 32 roll on their ball grooves 33, 34. The cover disk 30 has a bore into which a flexible insert piece 35 is inserted or vulcanized in place. To actuate the pushbutton 18, the cover disk 30 is rotated until the insert piece 35 is precisely opposite the pushbutton 18. Under the pressure loading of the insert piece 35 from outside, the latter gives way in order to actuate the pushbutton 18.

Figure 4:
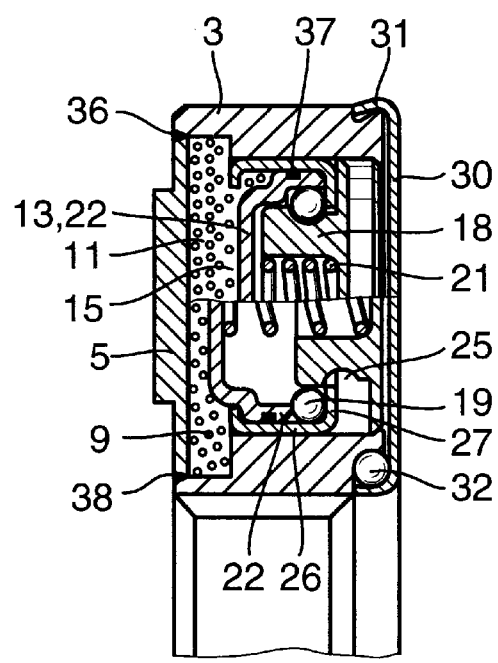
FIG. 4 shows a further clamping device according to the invention in longitudinal half section.

The inventive clamping device according to FIG. 4 differs from that from FIG. 3 essentially in that the ball ring for mounting the cover disk 30 is provided on the inner periphery of the annular cover disk. A further difference consists in the fact that the envelope 10 closed in a ring shape and intended for accommodating the silicone oil 11 has been dispensed with. Sealing rings 36, 37, 38 are provided instead in order to ensure that the silicone oil 11 does not leave the chamber 9 or the escape space 15. The sealing rings 36, 38 are inserted between the load piston 5 and the clamping nut 3, and the other sealing ring 37 is inserted between the sheet-metal sleeve 26 and the piston skirt 22.

| List of designations | |
|---|---|
| 1 | Grinding wheel |
| 2 | Counterholder |
| 3 | Clamping nut |
| 4 | Tapped hole |
| 5 | Load piston |
| 6 | First recess |
| 7 | Cylindrical surface |
| 8 | End face |
| 9 | Chamber |
| 10 | Envelope |
| 11 | Silicone oil |
| 12 | Second recess |
| 13 | Driving piston |
| 14 | Cylindrical surface |
| 15 | Escape space |
| 16 | Boundary line |
| 17 | Holding device |
| 18 | Pushbutton |
| 19 | Ball |
| 20 | Stop |
| 21 | Sloping surface |
| 22 | Piston skirt |
| 23 | Supporting surface |
| 24 | Stop surface |
| 25 | Ball groove |
| 26 | Sheet-metal sleeve |
| 27 | Flange |
| 28 | Flange |
| 29 | Check piece |
| 30 | Cover disk |
| 31 | Axial flange |
| 32 | Ball ring |
| 33 | Ball groove |
| 34 | Ball groove |
| 35 | Insert piece |
| 36 | Sealing ring |
| 37 | Sealing ring |
| 38 | Sealing ring |

What is claimed is:

1. A clamping device for the releasable fastening of a part (1) on a shaft, a clamping nut (3) which can be screwed onto the shaft being provided for clamping the part in place, a chamber (9) being provided between a pressure member (5) for bearing against the part and the clamping nut (3), this chamber (9) containing a hydraulic pressure medium (11), an escape space (15) which can be connected to the chamber (9) being provided for the hydraulic pressure medium (11), characterized in that the hydraulic pressure medium (11) is arranged in a flexible, closed envelope (10) which is impermeable to the hydraulic pressure medium (11) and which can be pushed into the escape space (15).

2. The clamping device as claimed in claim 1, in which a closure member (13, 17) is provided, in the first position of which the escape space (15) is blocked, and in the second position of which the escape space (15) is connected.

3. The clamping device as claimed in claim 1, in which a disk-shaped tool is arranged on a screw spindle of a powered hand tool.

4. The clamping device as claimed in claim 2, in which the envelope (10) follows deflections of the pressure member (5) and of the closure member (13, 17).

5. The clamping device as claimed in claim 1, in which the clamping nut (3) defines the escape space (15) and the chamber (9).

6. The clamping device as claimed in claim 1, in which the pressure member has an annular, load piston (5) which is arranged on the shaft in a longitudinally displaceable manner and defines the chamber (9).

7. The clamping device as claimed in claim 2, in which the closure member has a driving piston (13) which is arranged in a longitudinally displaceable manner and defines the escape space (15).

8. The clamping device as claimed in claims 6, and 7, in which a first piston area (8) of the load piston (5) is greater than a second piston area of the driving piston (13).

9. The clamping device as claimed in claim 6, in which the load piston (5) is arranged in a first recess (6) of the clamping nut (3), the clamping nut (3) and the load piston (5) defining the chamber (9).

10. The clamping device as claimed in claim 7, in which the driving piston (13) is arranged in a second recess (12) of the clamping nut (3), the clamping nut (3) and the driving piston (13) defining the escape space (15).

11. The clamping device as claimed in claim 7, in which the closure member has a releasable holding device (17) which holds the driving piston (13) in the second position, in which the escape space (15) is blocked.

12. The clamping device as claimed in claim 11, in which the holding device (17) has a pushbutton (18) and locking bodies (19), the pushbutton (18) holding the locking bodies (19) between the driving piston (13) and a stop (20).

13. The clamping device as claimed in claim 12, in which the stop (20, 27) is fastened to the clamping nut (3).

14. The clamping device as claimed in claim 12, in which the depressed pushbutton (18) opens a clearance space (25) for accommodating the locking bodies (19).

15. The clamping device as claimed in claim 12, in which the driving piston (13) is provided at a front end with a sloping surface (21) which is arranged so as to be inclined relative to the longitudinal axis of the driving piston (13) and is intended for bearing against the locking bodies (19).

16. The clamping device as claimed in claim 12, in which the pushbutton (18) has a supporting surface (23) for the locking bodies (19), on which supporting surface (23) the locking bodies (19) are supported in the initial position of the pushbutton (18).

17. The clamping device as claimed in claim 15 or 16, in which the sloping surface (21) is arranged at an oblique angle to the stop (20, 27) and to the supporting surface (23).

18. The clamping device as claimed in claim 12, in which the pushbutton (18) is moved into its initial position under spring deflection by means of a spring (21).

19. The clamping device as claimed in claim 13, in which the pushbutton (18) is moved into its initial position under spring deflection by means of a spring (21).

* * * * *